(12) United States Patent
El-Rifai

(10) Patent No.: US 8,081,362 B2
(45) Date of Patent: Dec. 20, 2011

(54) METHOD AND APPARATUS FOR STABILIZING GALVANOMETER SCANNER

(75) Inventor: Osamah El-Rifai, Cairo (EG)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 217 days.

(21) Appl. No.: 12/540,182

(22) Filed: Aug. 12, 2009

(65) Prior Publication Data

US 2011/0038022 A1    Feb. 17, 2011

(51) Int. Cl.
*G02B 26/08* (2006.01)

(52) U.S. Cl. .................. 359/200.1; 359/226.1; 310/90.5

(58) Field of Classification Search .... 359/197.1–200.3, 359/200.6–200.8, 204.2, 212.1–214.1, 221.1–221.3, 359/226.2, 223.1–226.3; 310/90.5
See application file for complete search history.

(56) References Cited

U.S. PATENT DOCUMENTS

| | | | |
|---|---|---|---|
| 5,469,289 A | 11/1995 | Iwao et al. | |
| 2002/0196512 A1* | 12/2002 | Karasaki et al. | 359/198 |

FOREIGN PATENT DOCUMENTS

JP        09146028        11/1997

* cited by examiner

*Primary Examiner* — Jennifer L. Doak

(74) *Attorney, Agent, or Firm* — Dirk Brinkman; Gene Vinokur

(57) ABSTRACT

A galvanometer scanner includes a mechanical support unit engaged with a far end of an optical element. A near end of the optical element is connected to an output shaft of an electric rotary motor. The mechanical support unit maintains an alignment of an axis of rotation of the optical element and an axis of rotation of the electric rotary motor.

8 Claims, 8 Drawing Sheets

METHOD AND APPARATUS FOR STABILIZING GALVANOMETER SCANNER

FIELD OF THE INVENTION

This invention relates generally to reflecting a light beam by a reflector, and more particularly using a stabilized rotating optical element in a galvanometer scanner.

BACKGROUND OF THE INVENTION

As shown in FIG. 1, a conventional galvanometer scanner typically includes a motor 110 with an output shaft 111 attached to a reflecting optical element 120. A sensor 130 detects a rotation angle of the output shaft. The output signal of the sensor is proportional to the rotation angle of the shaft.

Due to the extreme difficulty in aligning the center of mass of the optical element with the axis of rotation for dynamic balancing, the scanning motion due to rotation about X-axis of the shaft can cause unwanted vibration along the Y- and Z-axes, especially for high-speed optical scanning applications.

Therefore, it is desired to stabilize the optical element while it rotates.

SUMMARY OF THE INVENTION

DESCRIPTION OF THE INVENTION

Figure 1:
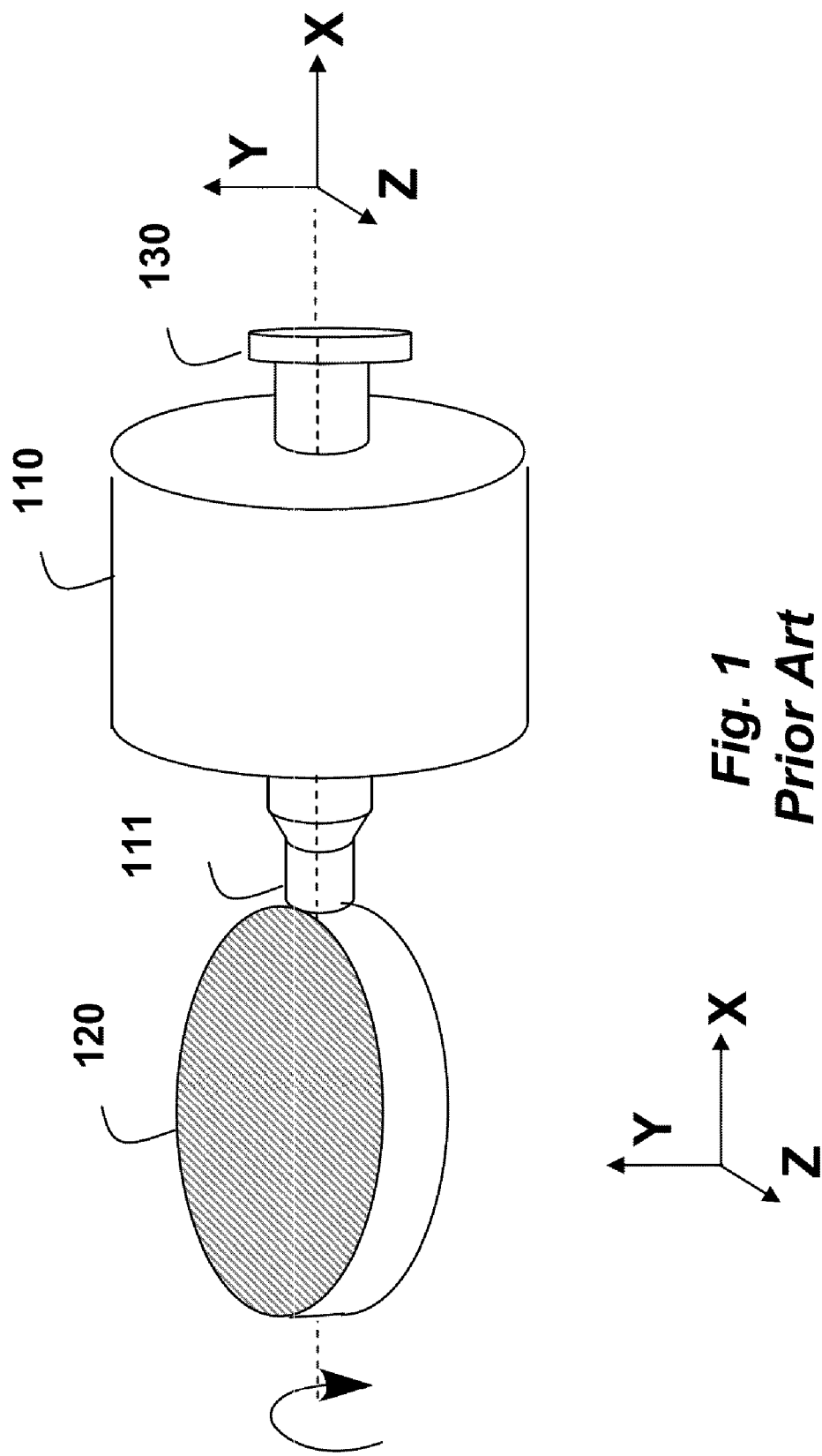
FIG. 1 is a schematic of a prior art galvanometer scanner.
Figure 2:
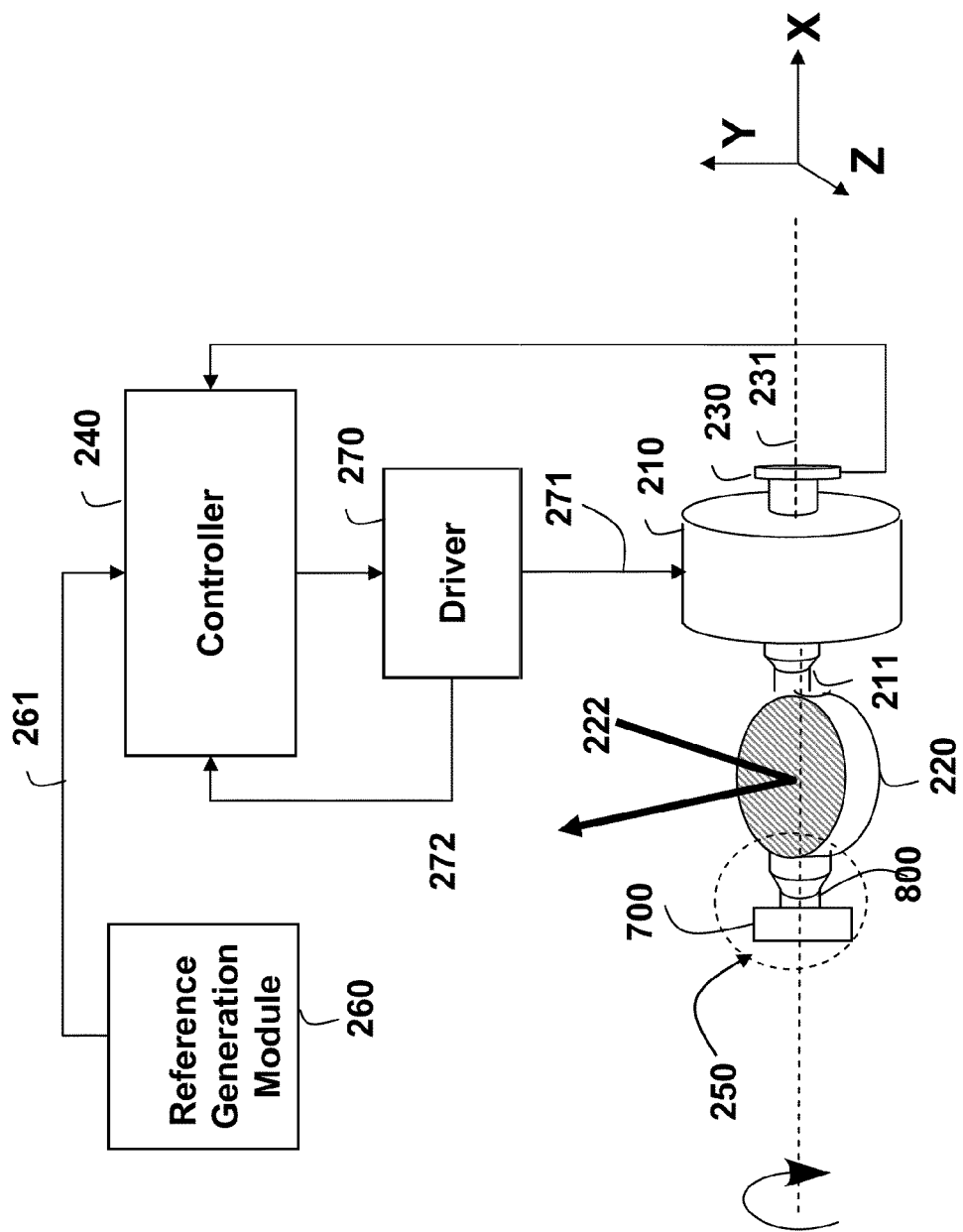
FIG. 2 is a schematic of a galvanometer scanner including a mechanical support unit (MSU) according to embodiments of the invention.

FIG. 2 shows a galvanometer scanner according to embodiments. The scanner includes an electric rotating motor 210 having an output shaft 211 attached to a near end of an optical element 220. The optical element can be a mirror to reflect light, a waveplate to polarize light, or a lens to transmit or refract reflect light.

The far end of the optical element is engaged with a mechanical support unit (MSU) 250. The MSU is fixed relative to the X-axis of rotation of the motor. The MSU constrains displacement of the optical element along the Y- and Z-axes, while allowing rotation. Therefore, mechanical vibration of the optical element is significantly reduced, which enables higher positioning accuracy than with conventional unconstrained galvanometer scanners.

A sensor 230 detects an angular velocity 231, which is output to a controller 240.

A reference generation module 260 generates a reference signal 261 for the controller. The controller generates a control signal 241 for a driver 270. The driver generates an input signal 271 for the motor. The driver also provides a feedback signal 272 for the controller.

Figure 6:
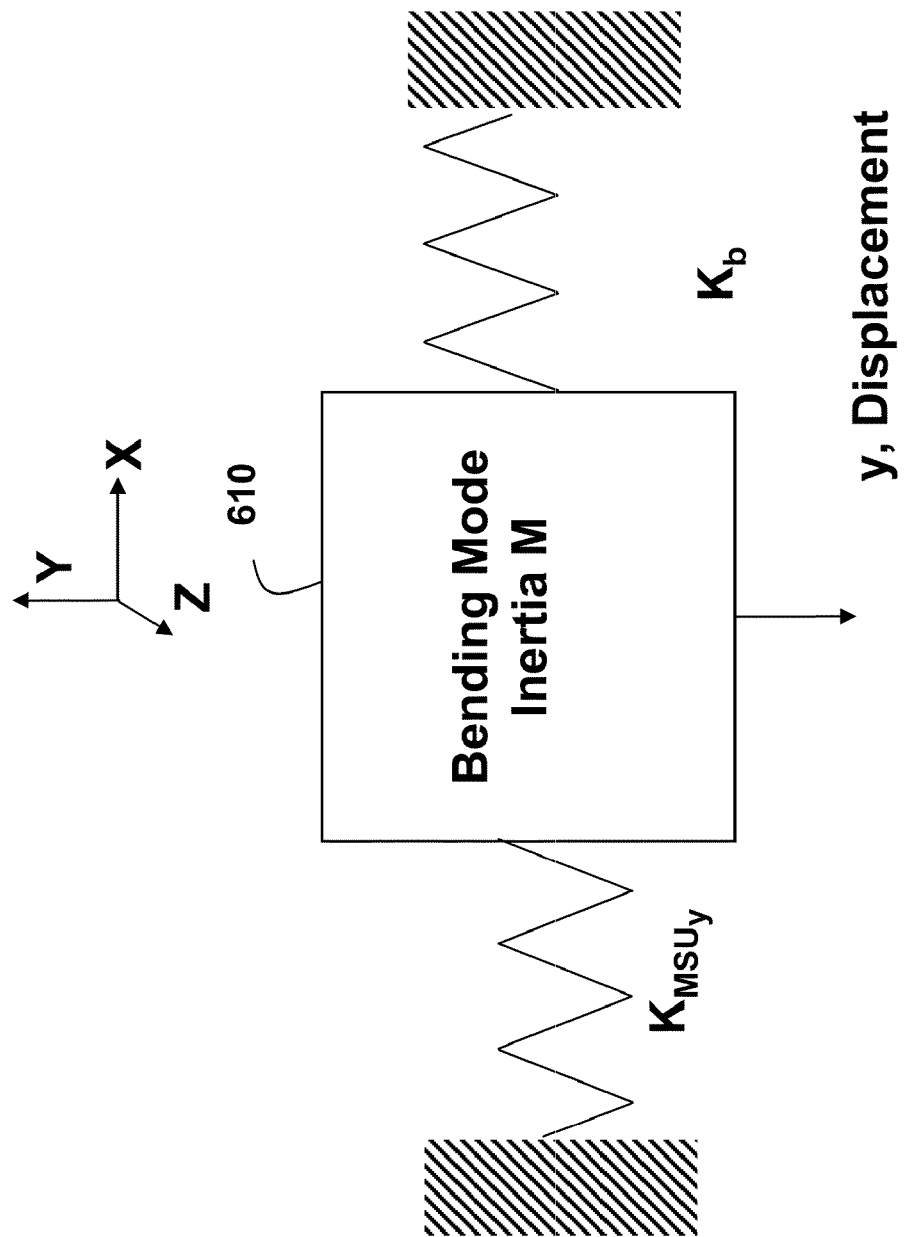
FIG. 6 a schematic of a model for a bending mode.

FIG. 6 shows a simplified model for a bending mode, e.g. motion along the Y-axis. Vibration of the optical element used by the invention is $$M\ddot{y}+(K_b+K_{MSU_y})y=0,$$

where M is the bending mode modal inertia 610, y is the displacement of the optical element in the y-direction, $K_b$ is the bending mode modal stiffness, $K_{MSU_y}$ is a stiffness of the MSU in the y-direction, and "¨" indicates a second derivative. The resonance frequency of the bending mode is $$\omega_b = \sqrt{\frac{K_b + K_{MSU_y}}{M}}.$$

Figure 4:
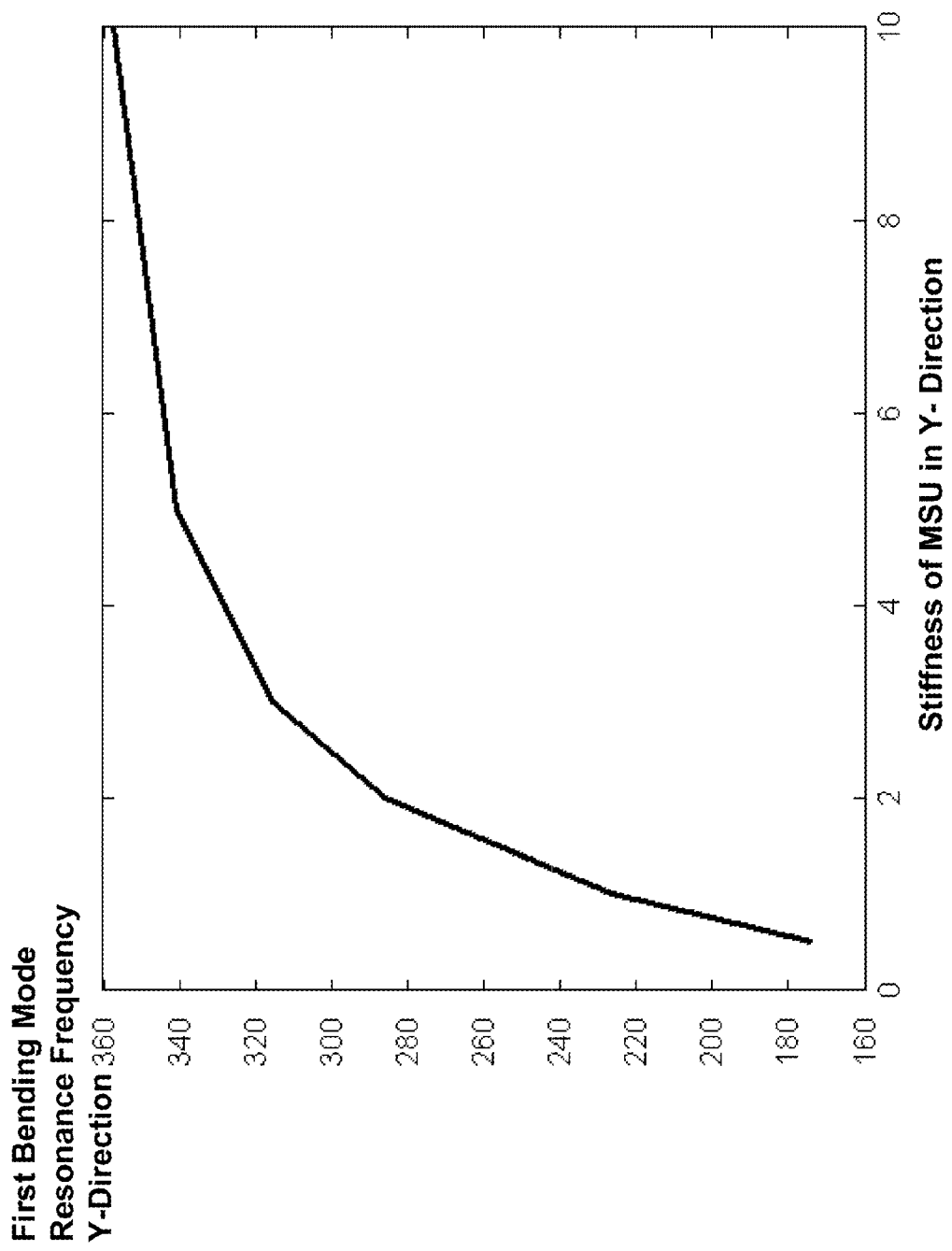
FIG. 4 is a graph of bending mode as a function of stiffness.

As shown in FIG. 4, the bending mode resonance frequency increases with increased $K_{MSU_y}$.

The bending mode is less affected by the scanning motion, i.e., rotation about the X-axis, hence, improving the accuracy of scanning or positioning a light beam 222. Similar analysis and conclusions can be made for vibration in the Z-direction.

Figure 5:
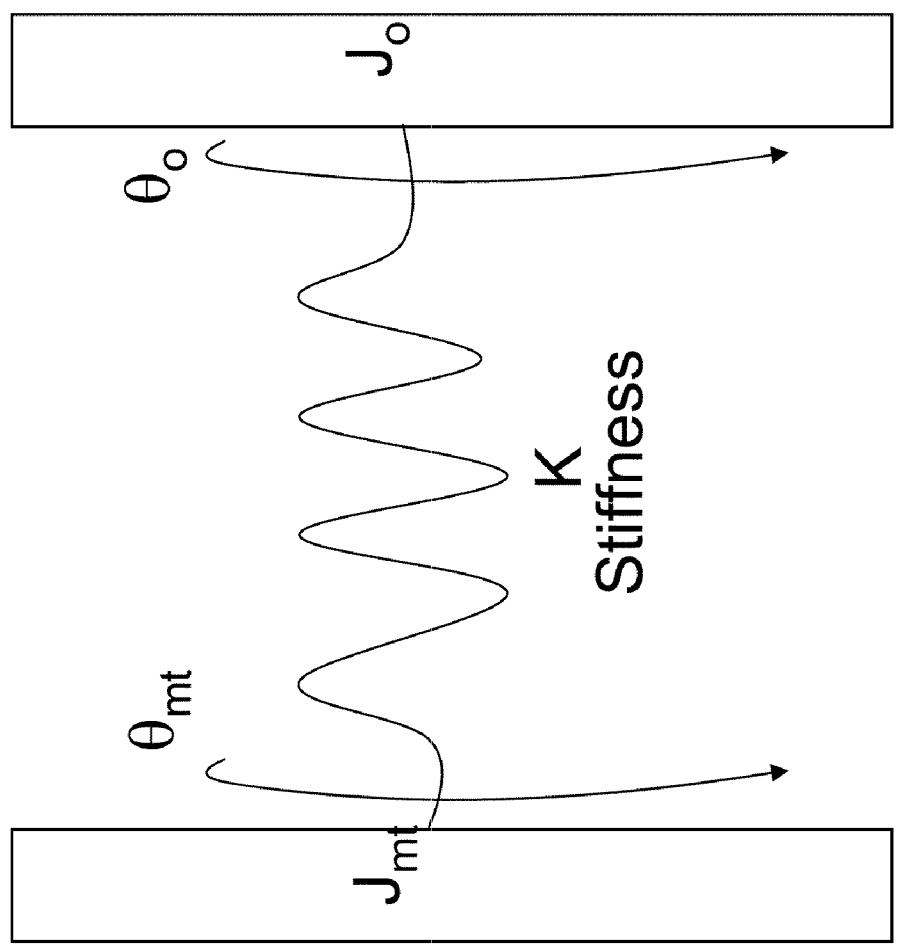
FIG. 5 schematic of a simplified model for a torsional mode.

FIG. 5 shows a simplified model of a torsional mode:

$$J_{mt}\ddot{\theta}_{mt}+K\theta_{mt}=K\theta_o,$$

$$J_o\ddot{\theta}_o+K\theta_o=K\theta_{mt}$$

where, $J_{mt}$ is the inertia of the motor, $J_o$ inertia of the optical element, $\theta$ is the angle of rotation, and K is the stiffness of the torsional mode. The resonance frequency of the torsional mode is $$\omega_t = \sqrt{\frac{K(J_{mt}+J_o)}{J_{mt}J_o}}.$$

For first order analysis, the added rotating inertia, i.e., inertia about the X-axis, of the MSU can be added to $J_o$ in the above equation. Therefore, it is beneficial to keep the rotating inertia of the MSU as small as possible. This would keep the resonance frequency of the torsional mode, i.e., vibrational mode about X-axis, as high as possible.

Alignment

Figure 3:
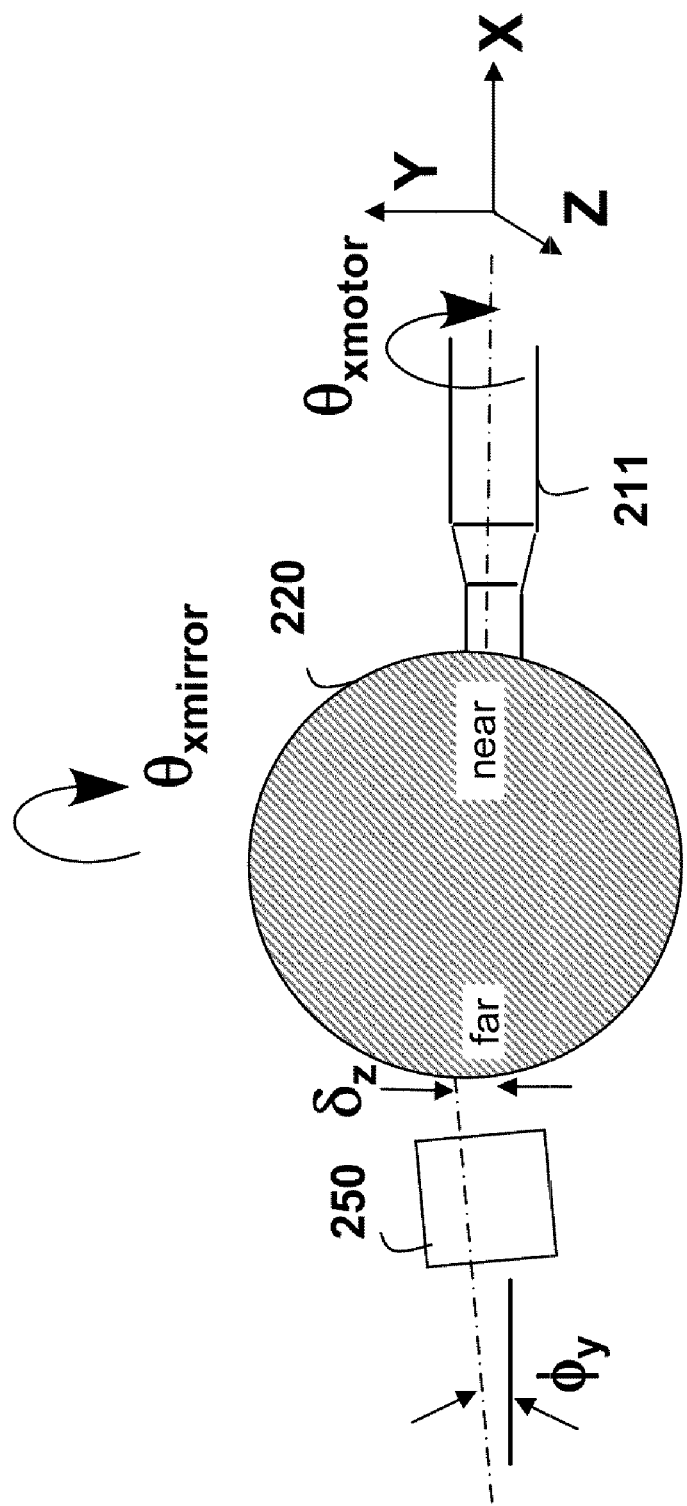
FIG. 3 a schematic of alignment errors between the mechanical support unit and the axis of rotation of the scanner.

Due to practical limitations, misalignment between the axis of rotation of the motor and the axis of rotation of the is likely as shown in FIG. 3 for the X-Y plane as $\delta_z$ for displacement misalignment in the z direction, and $\phi_y$ as the angular misalignment about the Y-axis. Similar misalignments could be present in the y direction $\delta_y$ and $\phi_z$ as the angular misalignment about the Z-axis.

Tradeoff of Stiffness vs. Misalignment

There is a tradeoff between the mechanical stiffness of the MSU in the x, y, and z directions, the reduction of the mechanical vibration in these directions, and the resistance of rotation about X-axis due to misalignment. Higher stiffness increases the mechanical resonance frequency in bending modes in the y and z directions, but makes the reaction force and torques at the MSU due to misalignment bigger. Therefore, the MSU should be designed for that tradeoff.

FIG. 4 shows increase in bending resonance frequency in the Y-axis vs. MSU stiffness in the y-direction.

Preferred Embodiments

Figure 7:
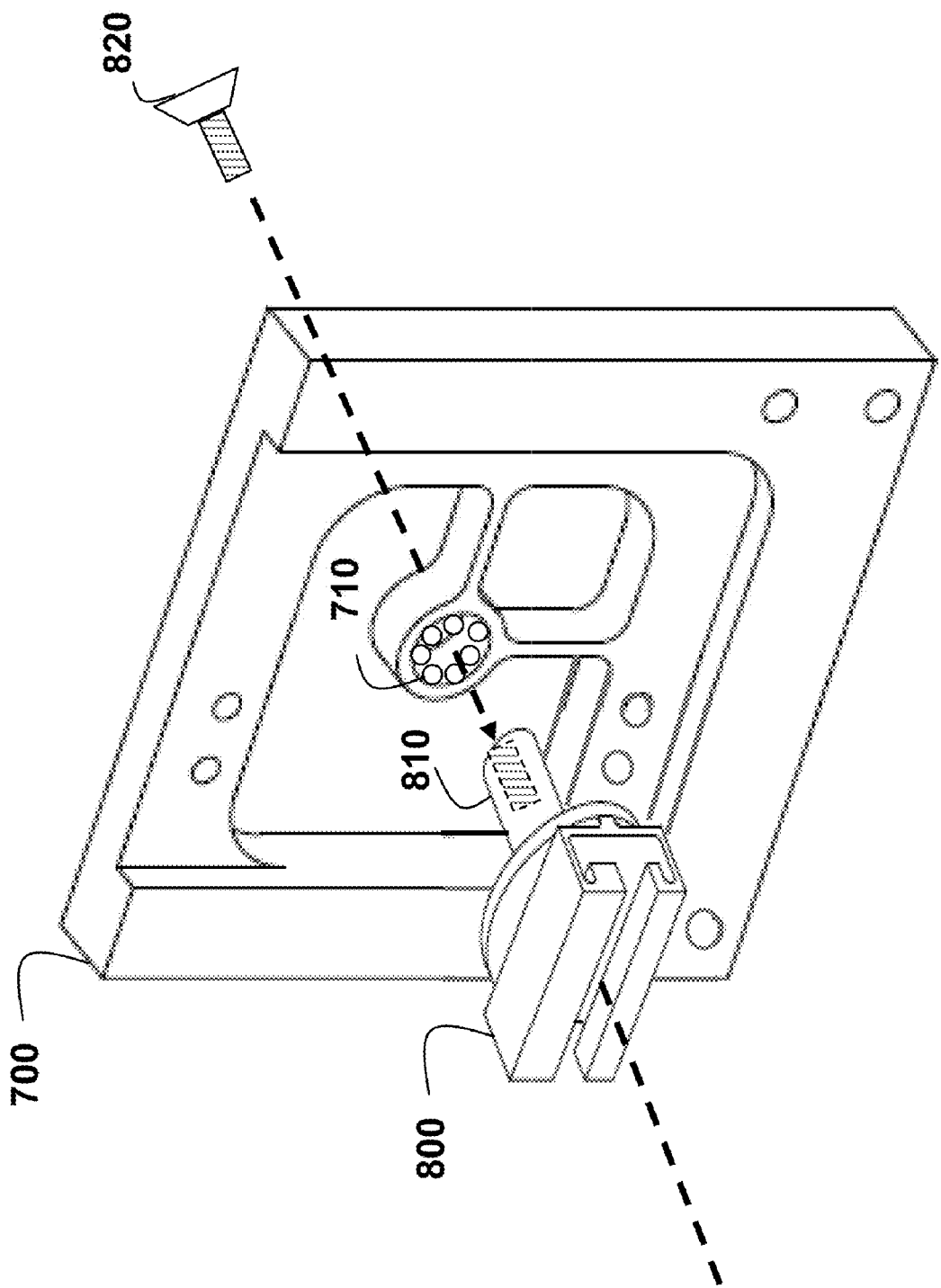
FIG. 7 is a perspective view of a bearing support structure according to an embodiment of the invention.
Figure 8:
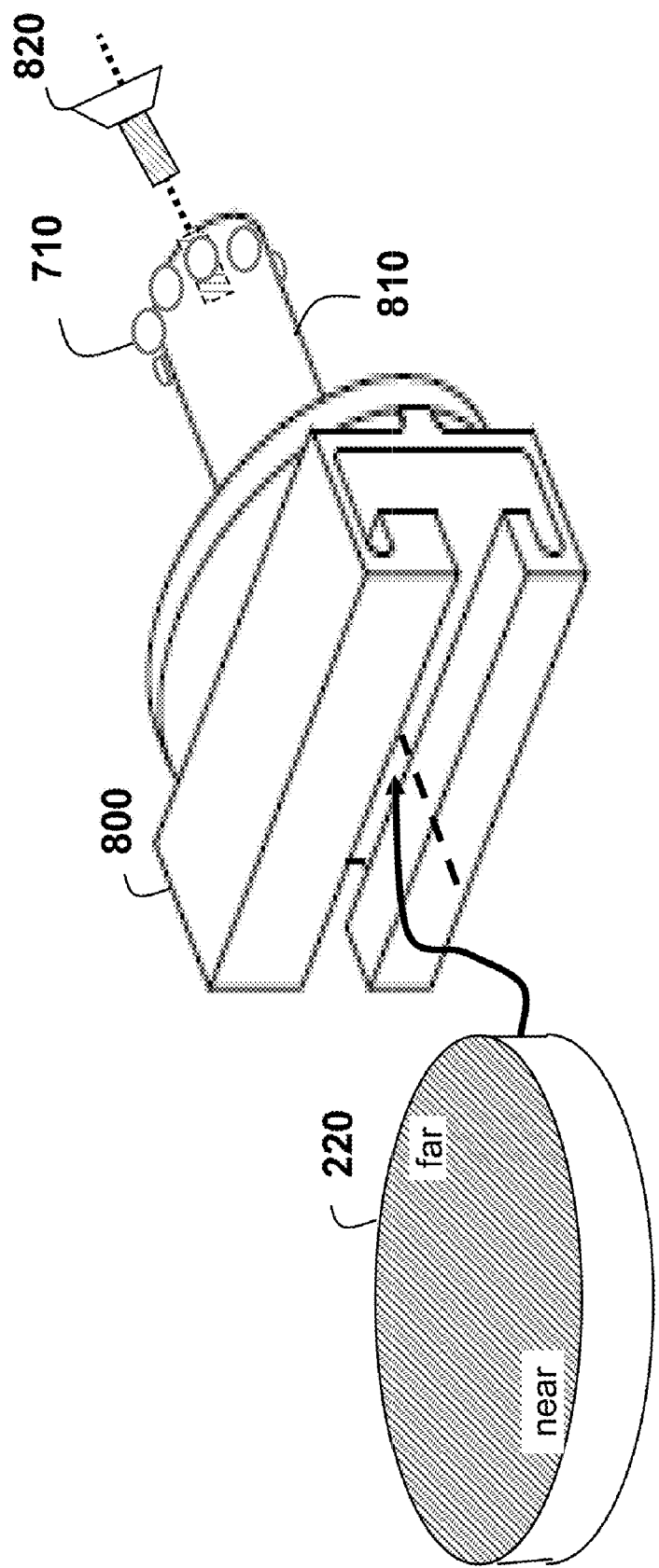
FIG. 8 is perspective view of a mechanical mount for an optical element.

As shown in FIGS. 7-8, the mechanical support unit (MSU) 250 includes a support structure 700 and a mechanical mount 800, which is engaged the far end of the optical element 220. Bearings 710 engage a shaft 810 of the mechanical mount with the mechanical support structure 700.

The MSU reduces the displacement of the optical element 220 in the x, y, and z directions, and rotations about Y- and Z-axes, while allowing rotation about the X-axis. The support structure houses the bearing system and allows placement of the bearing in a preferred position relative to the rotating axis.

As shown in FIG. 8, the mechanical mount 800 is used to engage the optical element 220 with the mechanical support unit. A screw 820 threaded into a far end of the shaft 810 provides a preferred load on the shaft, and thus the optical element. The optical element is attached to the mechanical mount by means of glue or adhesive. The mechanical mount is designed to aid in providing a preferred mechanical stiffness as shown in FIG. 4.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A galvanometer scanner, comprising:
a mechanical support unit engaged with a far end of an optical element, wherein a near end of the optical element is connected to an output shaft of an electric rotary motor, wherein the mechanical support unit maintains an alignment of an axis of rotation of the optical element and an axis of rotation of the electric rotary motor, wherein a tensional mode is $$J_{mt}\ddot{\theta}_{mt}+K\theta_{mt}=K\theta_o,$$

$$J_o\ddot{\theta}_o+K\theta_o=K\theta_{mt}$$

where, $J_{et}$, is an inertia of the motor, $J_o$ inertia of the optical element, $\theta$ is an angle of rotation, and K is a stiffness of the tensional mode, and "¨" indicates the second derivative with respect to time.

2. The galvanometer scanner of claim 1, wherein the optical element is a mirror, a wave plate, or a lens.

3. The galvanometer scanner of claim 1, wherein the mechanical support unit is fixed relative to a X-axis of rotation of the motor, and constrains displacement of the optical element along an Y- and Z-axes while rotating.

4. The galvanometer scanner of claim 3, wherein vibration of the optical element is $$M\ddot{y}+(K_b+K_{MSU_y})y=0,$$

where M a bending mode modal inertia, y is a displacement of the optical element along the Y-axis, $K_b$ is a bending mode modal stiffness, $K_{asey}$ is a stiffness of the mechanical support unit along the Y-axis, and "¨" indicates a second derivative with respect to time.

5. The galvanometer scanner of claim 4, wherein a resonance frequency of the bending mode is $$\omega_b = \sqrt{\frac{K_b + K_{MSU_y}}{M}}.$$

6. The galvanometer scanner of claim 3, wherein there is a tradeoff between a mechanical stiffness of the mechanical support unit U along the X-, Y- and Z-axes, a reduction of mechanical vibration along the axes, and a resistance of rotation about X-axis due to misalignment.

7. The galvanometer scanner of claim 1, wherein a resonance frequency of the tensional mode is $$\omega_t = \sqrt{\frac{K(J_{mt} + J_o)}{J_{mt}J_o}}.$$

8. The galvanometer as in claim 1, further comprising:
a shaft configured to engage the far end of the optical element with a bearing of the mechanical support unit; and
a screw threaded into and a far end of the shaft to provide a preferred load on the optical element.

* * * * *